Figure 1:
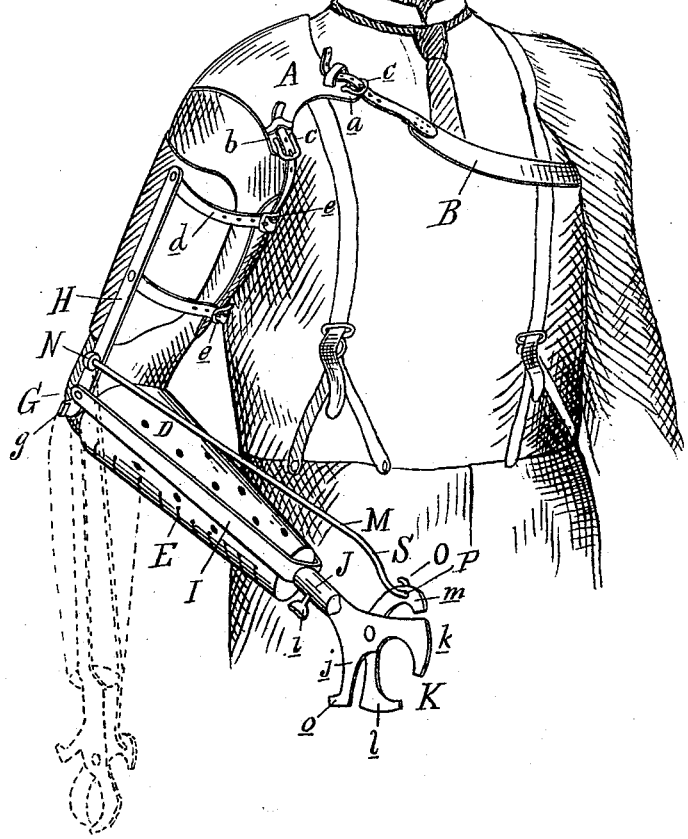

(No Model.) 2 Sheets—Sheet 1.

J. J. ALLWARD.
ARTIFICIAL ARM AND HAND.

No. 396,061. Patented Jan. 15, 1889.

Witnesses:
P. M. Hulbert
John Schuman

Inventor:
Judson J. Allward
By Thos. S. Sprague & Son
Atty.

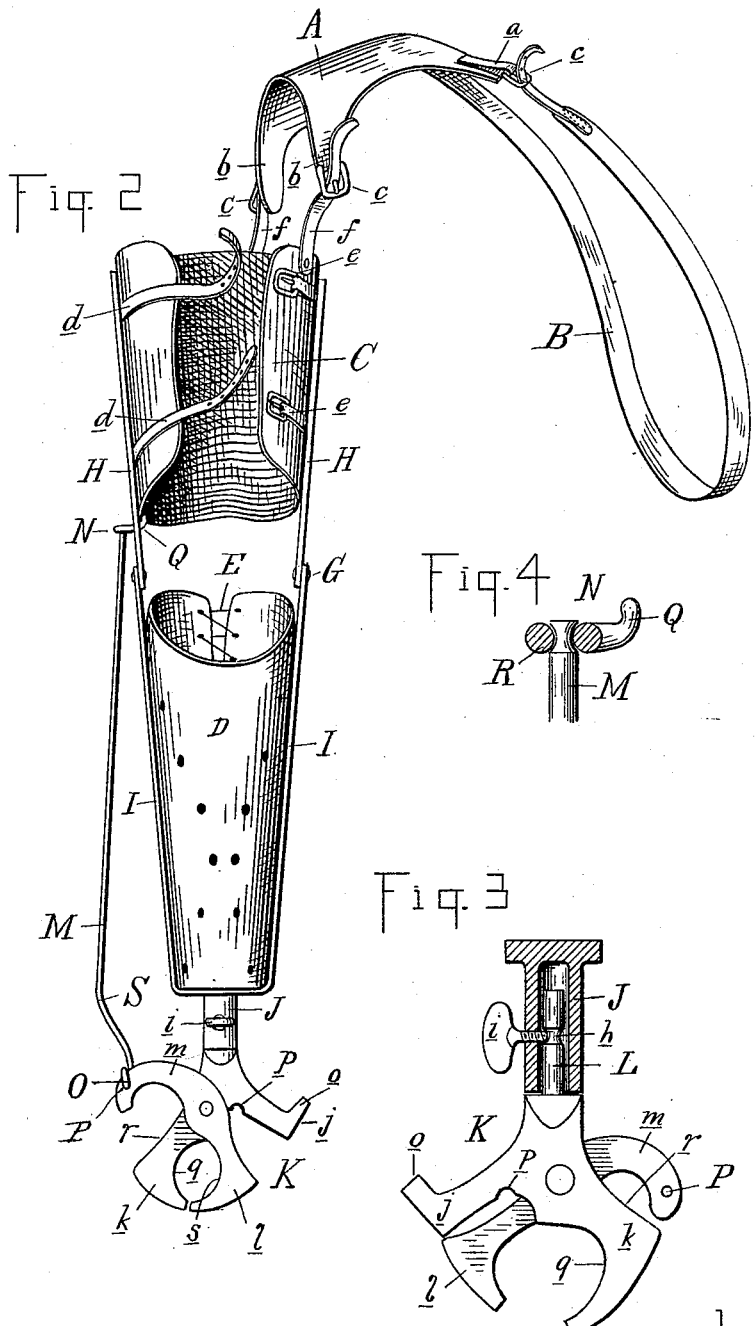

UNITED STATES PATENT OFFICE.

JUDSON J. ALLWARD, OF COLUMBIAVILLE, MICHIGAN.

ARTIFICIAL ARM AND HAND.

SPECIFICATION forming part of Letters Patent No. 396,061, dated January 15, 1889.

Application filed October 29, 1888. Serial No. 289,367. (No model.)

*To all whom it may concern:*

Be it known that I, JUDSON J. ALLWARD, a citizen of the United States, residing at Columbiaville, in the county of Lapeer and State of Michigan, have invented certain new and useful Improvements in Artificial Arms and Hands, of which the following is a specification, reference being had therein to the accompanying drawings.

This invention relates to new and useful improvements in artificial arms, and it refers more specifically to that class of artificial arms applicable to amputations below the elbow.

The invention consists in the peculiar construction and arrangement of the artificial hand or claw, and further, in the construction, arrangement, and combination of the different parts, whereby great simplicity is obtained; while the device at the same time is adapted to a variety of uses, all as more fully hereinafter described, and shown in the accompanying drawings, in which—

Figure 1 is a perspective view of said device as in use. Fig. 2 is a detached view of the same. Fig. 3 is a plan of the claw, showing the construction of the wrist-joint in detail. Fig. 4 is a detail showing the swivel at the inner end of the rod.

A is a shoulder-cap, preferably made of stiff leather and adapted to fit on top of the shoulder, and having the forwardly and rearwardly extending short straps $aa$ and $bb$, to the free end of each of which is attached a suitable buckle, $c$.

B is a body-strap, the ends of which are adjustably secured to the buckles on the straps $aa$, the said body-strap being of suitable length to pass around the body under the armpit, as shown, and thereby to hold the shoulder-cap in its adjustable position.

C is a casing adapted to receive the upper arm. This is preferably made of soft leather, and is provided with the straps $d$ and buckles $e$, to be adjustably secured to the upper arm, as shown. This casing is also provided on its upper end, in front and rear, respectively, with the straps $ff$, by means of which the casing is adjustably secured to the buckles $c$ of the shoulder-cap.

D is a socket to receive the stump of the forearm, and this is also preferably formed of stiff leather, and is perforated or provided with openings for ventilation, and upon its under side it is cut open and provided with suitable lacing, E, to adjustably secure it to the stump of the forearm.

G is an elbow-joint formed by a pivotal connection of the bars H H and I I, which are respectively secured upon opposite sides of the casing and the socket, and this elbow-joint is of the kind known as "rule-joint," preferably formed by extending the bars H beyond their pivotal connection and providing them with a lip, $g$.

J is a metallic socket secured to the forward end of the socket of the forearm, preferably by making it integral with the bars I I.

K is a double claw provided with a shank, L, adapted to engage into the socket J, and be rotatably and adjustably secured therein, preferably by providing the shank with an annular groove, $h$, in which the inner end of the thumb-screw $i$ engages to adjustably and detachably secure the claw in position. The claw is provided with the stationary jaws $j$ and $k$ and the movable jaws $l$ and $m$. The movable jaws $l$ and $m$ constitute the opposite arms of a lever by being made in one piece, pivotally secured by a suitable pivot-pin at or near the junction of the stationary jaws $k$ and $j$.

M is a wire rod, secured at its inner end by means of the swivel N to the outer bar, H, of the casing, near the elbow-joint, and provided upon its outer end with a hook, O, detachably engaged in an eye or aperture, P, formed on the jaw $m$.

The swivel N is preferably constructed as shown in Fig. 4, and consists of the hook-stud Q, adapted to detachably engage with its hooked end into a suitable hole or aperture on the bar H and provided with an eye, R, into which the end of the rod M is secured, free to rotate upon its axis. The stud Q has a limited loose play in the bar H, the rod M has a limited loose play in the eye of the stud, and the hook O of the rod has a limited loose play in the eye P of the movable jaw, all sufficient to permit of the free movement of the parts without binding each other, and to permit the disengagement of the stud Q from the bar H and of the hook O from the jaw, if desired.

The stationary and movable jaws are peculiarly formed and with a special view to permit of numerous applications of the device for holding, lifting, and handling articles of different sizes, as a natural adaptation of the fingers of the hand to different kinds of work. Thus the stationary jaw $j$ is provided with a hooked end, $o$, and with a notch, $p$, at its base. The other stationary jaw is preferably provided with a circular inner face, $q$, and a straight or slightly-curved outer face, $r$. The movable jaw $l$ is preferably provided with a circular inner face, $s$, and the movable jaw $m$ is preferably hook-shaped.

In practice, the parts being constructed and arranged as described and shown, it will be seen that when the device is adjusted to the arm of the wearer, as shown in Fig. 1, the flexure of the forearm operates the movable jaws in one direction through the medium of the rod M, while the extension of the arm operates the movable jaws in the opposite direction. At the same time the motion of flexion or extension will produce in each case the separation or opening of one pair of jaws and the closing or contraction of another pair of jaws. Thus, also, there is but one cord. An article may be grasped either by the flexion or extension of the arm, and this, in combination with the variety of forms of the jaws, adapts the jaws to perform a variety of work. Thus a pencil for writing, for instance, may be held in the notch $p$ if the jaws L and J are closed upon each other. A broom or similar article may be readily held between the jaws $k$ and $l$. An article of irregular form may be grasped between the jaws $m$ and $k$. The extremities of the jaws $k$ and $l$ operate as a thumb and finger, while the various combinations of the movable and stationary jaws form an equivalent of the hand and thumb.

The free end of the rod M is provided with a bend, S, which prevents it from interfering with the cuffs or sleeve of the wearer and enables it to operate freely at any position of the arm. By means of the set-screws $i$ the claw can be rotated in its socket and secured in any desired position convenient to the wearer. The rod M, being rotatable in the eye of the swivel, will adjust the part in the proper position for work without binding.

The claw K and the rod M are made readily detachable, for the purpose of securing tools of any kind to the socket J. Such tools have necessarily to be provided with a shank similar to the shank L of the claw, and thus a knife, a fork, or some other tool better adapted than the claw for a particular kind of work, may be readily secured in lieu thereof.

What I claim as my invention is—

1. The combination, in artificial arms, of the shoulder-cap A, provided with a body-strap, B, the casing C, strapped to the shoulder-cap, the socket of the forearm D, secured by an elbow-joint to the casing C, the socket J on the forearm, the claw detachably secured to said socket, and the rod M, connected by the swivel-joint N to the casing of the upper arm and to the movable jaw of the claw, substantially as described.

2. The combination, with the forearm, of the socket J formed thereon, the claw K, provided with a shank, L, adapted to engage into the socket J and having an annular groove, $h$, and the set-screw $i$.

3. In an artificial arm, the combination, with the movable jaw of a claw provided with an eye, P, of the rod M, provided with the hook O, and the swivel N, detachably connecting it to the casing of the upper arm near the elbow-joint, substantially as described.

4. The combination, with the casing C and socket D, of the bars H and I, secured upon opposite sides thereof, respectively, the elbow-joint G, the claw K, having the stationary and movable jaws, and the rod M, provided upon one end with the hook O and at the other with the swivel N, consisting of the hook-stud Q, provided with an eye, R, in which the rod M is rotatably secured, all arranged and constructed to operate as described.

5. The claw K, consisting of the stationary jaws $j$ and $k$ and the movable jaws $l$ and $m$ in one piece and pivotally secured to the stationary part of the claw, in combination with the rod M, substantially as described.

6. The claw K, provided with a shank, L, adjustably and detachably secured to the socket of the arm D, the stationary jaws $j$ and $k$, provided with the hook O and circular face $q$, respectively, and the movable jaw $l$, provided with the curved face $s$, and the hook-shaped movable jaw $m$, substantially as described.

In testimony whereof I affix my signature, in presence of two witnesses, this 23d day of August, 1888.

JUDSON J. ALLWARD.

Witnesses:
P. M. HULBERT,
JOHN SCHUMAN.